2,722,054
Patented Nov. 1, 1955

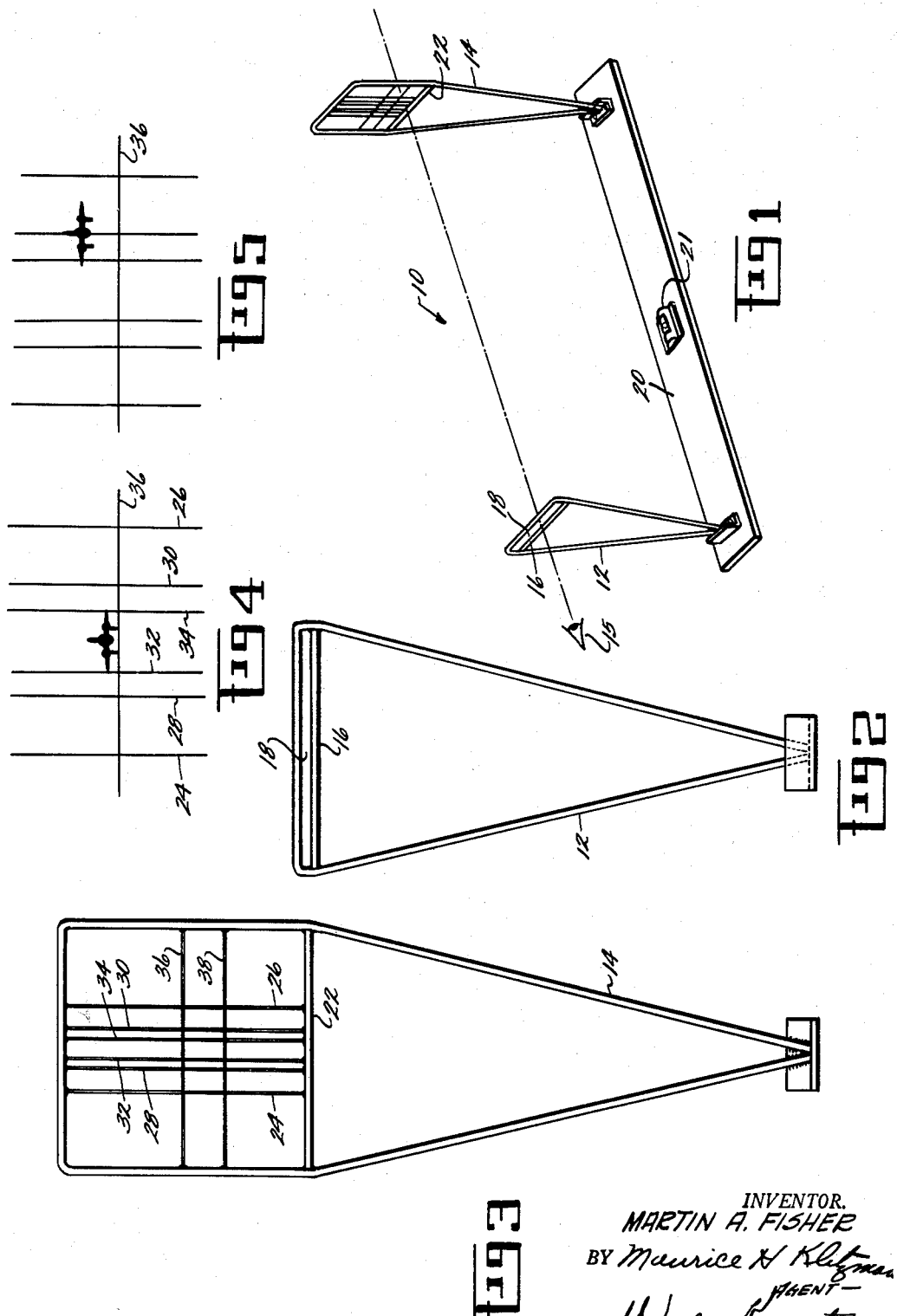

2,722,054
GROUND CONTROL APPROACH SYSTEM

Martin A. Fisher, Miami, Fla.

Application July 22, 1952, Serial No. 300,366

2 Claims. (Cl. 33—64)

(Granted under Title 35, U. S. Code (1952), sec. 266)

The invention described herein may be manufactured and used by or for the Government for governmental purposes without payment to me of any royalty thereon.

This invention relates to an aircraft training device and in particular to a ground approach system for hooded aircraft in training pilots to make instrument landings.

An expensive system of using radar or the like is now the system utilized by the Air Force. This system is quite complicated in its mechanical construction and very expensive. Further the maintenance cost of radar is very expensive. It is therefore an object of this invention to provide a very cheap mechanical device for performing the same objects for training purposes as the radar system in connection with ground control approach systems.

It is a further object of this invention to provide a ground control system that is easy to manufacture and easy to put together in the field.

It is a still further object of this invention to provide a simple and efficient ground control approach system that may be used with a minimum amount of training of personnel.

It is a still further object of this invention to provide a device consisting of a simple sighting bar having a grid arrangement for sighting an aircraft therethrough. The purpose being to direct the landing of the aircraft from the ground by radio communication with the pilot, who is flying blind on instruments under a hood.

These and other objects will become more apparent when read in the light of the accompanying drawings and specification wherein similar parts have like numbers and wherein:

Fig. 1 is a perspective view showing the assembled device provided with a back sight and a fore sight.

Figs. 2 and 3 show the back sight and fore sight respectively in elevation views.

Fig. 4 is a schematic view showing an aircraft sighted through the grid of the fore sight located on the correct horizontal glide path line.

Fig. 5 is another schematic view showing the aircraft sighted through the grid of the fore sight but being too high above the horizontal glide path reference line and also slightly off course.

Referring to the drawings, 10 generally designates the ground approach system provided wtih a back sight 12 and a fore sight 14. The eye of the scanner is represented at 15. A horizontal bar 16 in the back sight 12 is spaced a short distance from the top thereof to provide a horizontal sight opening 18. The back sight is further mounted on a common base 20 and aligned perpendicular thereto. The base 20 is further provided with a level 21. The center of the sight 18 is a fixed distance from the common base 20, for example 12 inches. The fore sight 14 is provided with a horizontal bar 22, which bar is mounted the same distance above the common base member 20 as the center of the sight 18. The fore sight 14 is mounted a predetermined distance in front of the back sight 12. This distance may be any convenient amount and the inventor has chosen to use 5 feet. The fore sight 14 is further provided with a grid formed of brass welding rod or the like braised to the frame of the fore sight 14, the said grid having vertical lines spaced a predetermined distance apart and horizontal lines spaced a predetermined distance apart. The grid is designed for a particular aircraft that probably would be used for training purposes. The distance between the vertical lines are determined by knowing the wing spread of the aircraft, the miles or distance from touchdown and the distance between the back sight and fore sight. With these known distances, a proportion may be set up for determining the distance between the vertical lines of the grid by the following formula:

$$\frac{X}{Y} = \frac{W}{F}$$

wherein X represents the distance between the vertical lines of the grid; Y represents the distance between the fore sight and the back sight; W represents the wing spread of the aircraft; and F represents the number of feet the aircraft is from touchdown. For example, if 100 feet is used as the wing spread of the known aircraft, 2 miles in the number of feet the aircraft is from touchdown, and 5 feet the distance between the back sight and fore sight, X, the distance between the vertical lines, will have a value of approximately ½ inch. This is represented in Fig. 4 by the two lines 24 and 26. The 4 mile distance is represented by lines 28 and 30 and the 6 mile distance by lines 32 and 34. The grid is further provided with a horizontal reference glide path line 36. This is determined by knowing the altitude that an aircraft should maintain at a known distance, for example, at 4 miles the aircraft should maintain an altitude of 1000 feet when approaching a runway. Since the distance between the back sight and the fore sight is known, again a formula may be set up for determining the distance this horizontal glide path reference line should be above the horizontal bar 22 by the formula:

$$\frac{A}{B} = \frac{C}{D}$$

where A is equal to the height of the horizontal glide path reference line above the horizontal bar 22; B is equal to the distance between the back sight and the fore sight; D is equal to the distance of an aircraft from touchdown; C is equal to the altitude at the distance from touchdown. Using 4 miles as the distance the aircraft is from touchdown, 1000 feet as the altitude which the aircraft should be at a distance of 4 miles; and 5 feet the distance between the back sight and the fore sight; A will be approximately 3 inches. Also if the aircraft is at a distance of 6 miles, the altitude at that distance should be 1500 feet whereby A again will be approximately 3 inches since the same proportions will be maintained. The lower horizontal reference line 38 in the grid serves to indicate 1000 feet at 6 miles. It is pointed out that the dimensions of the back sight and fore sight may be made to conform to any desirable ground control approach pattern since this may vary with the different localities.

In operation the ground approach device may be mounted on a jeep or the like adjacent the runway on the field and sufficiently close to the runway to sight an approaching aircraft. The ground control assembly is leveled in a direction in line with the runway in readiness for use. When the aircraft is turning from its base leg to its approach to the landing strip the scanner sights through the opening 18 and through the grid of the fore sight, sighting the aircraft therein. When the aircraft is as far as 6 miles away, its wing spread will fill the inside pair of lines 32 and 34 if it is on the correct course in its approach. Also the aircraft should be on the horizontal reference line 36 or 38 depending on the approach pattern in order to be on the correct glide path. This is shown in Fig. 4. However, if the aircraft is above the glide path reference line as shown in Fig. 5 or below it, the scanner can issue instructions to the hooded aircraft to direct it to the correct glide path. Further, if the aircraft is off course as shown in Fig. 5, the scanner can again issue the correct azimuth instructions, such as turn so many degrees left or right, so as to enable the pilot of the aircraft to return to the correct course. The scanner will continue to issue instructions to the pilot at different intervals, for example at 4 miles the aircraft should fill the next pair of vertical lines 28 and 30 in the grid and should still be on the horizontal reference line. If such is not the case, the scanner will again issue instructions to the pilot telling him how to maintain the correct azimuth and glide path.

By this ground approach system a simple and inexpensive device is provided to perform the same function as a radar system for instructing and training pilots in hooded aircraft. This system was used without the pilot's knowledge instead of radar, and the results of the accuracy with which this was done amazed all concerned. There is a great need for a device of this type in the Air Force and at present is being used extensively at one of the aircraft training bases. With a minimum of instruction in voice procedure, sequence of controller instructions and orientation as to surrounding landmarks to be used as reference points, a scanner or controller can be trained so as to be capable of directing an aircraft from a radio fix, throgh a normal ground control approach pattern, to touchdown. Complete control of the aircraft can be maintained any time the visibility permits visual reference to the aircraft from its entry onto downwind leg through the balance of the pattern.

It is apparent the specific embodiment shown above has been given by way of illustration and not by way of limitation and that the structures above described are subject to wide variation and modification without departing from the scope or intent of the invention, all of which variations and modifications are to be considered as equivalents and be included within the scope of the present invention.

I claim:

1. Apparatus for a ground control approach training system including a common base member, a backsight and a foresight mounted a predetermined distance apart on said member in alignment with each other for sighting aircraft therethrough, said backsight including a horizontal bar, said foresight including a grid, said grid having a plurality of pairs of vertical bars, each pair of said vertical bars being spaced a different predetermined distance apart to represent a different distance of the aircraft from its touch down when the wingspread for the aircraft fills the space between the pair of vertical bars, said grid having a plurality of horizontal bars, the lowermost of said horizontal bars in said grid and the horizontal bar in said backsight being the same distance above the base member for sighting the horizon, and each of said other horizontal bars in said grid being spaced a different distance above the lowermost of said horizontal bars in said grid with each distance being in accordance with a different predetermined glide path for the aircraft.

2. Apparatus for a ground control approach training system including a common base member, a backsight and a foresight mounted a predetermined distance apart on said member in alignment with each other for sighting aircraft therethrough, said backsight including a horizontal bar, said foresight including a grid, said grid having a plurality of pairs of vertical bars, each pair of said vertical bars being spaced a different predetermined distance with the distance being proportional to the distance between said foresight and said backsight in the same ratio as the wingspread of the aircraft is to the distance of the aircraft from touch down, said grid having a plurality of horizontal bars, the lowermost of said horizontal bars in said grid and the horizontal bar in said backsight being the same distance above the base member for sighting the horizon, and each of said other horizontal bars in said grid being spaced a different distance above the lowermost of said horizontal bars in said grid with the distance being proportional to the distance between the foresight and the backsight in the same ratio as the altitude of the aircraft at the distance from touch down is to the distance of the aircraft from touch down.

References Cited in the file of this patent

UNITED STATES PATENTS

| | | |
|---|---|---|
| 1,349,277 | Honig | Aug. 10, 1920 |
| 1,605,884 | Wilkinson | Nov. 2, 1926 |
| 1,771,903 | Soth | July 29, 1930 |
| 2,154,454 | Joyce | Apr. 18, 1939 |
| 2,222,297 | Mesjian | Nov. 19, 1940 |
| 2,463,182 | Ketay | Mar. 1, 1949 |

OTHER REFERENCES

Cookman: "Radar Lands Them Blind," Popular Mechanics magazine, June 1946, pages 81–85. (Copy in 35-10.4.)